Feb. 24, 1959  C. S. KING  2,874,765
FUEL SUPPLY SYSTEM FOR A GAS TURBINE ENGINE POWER PLANT
Filed May 9, 1955
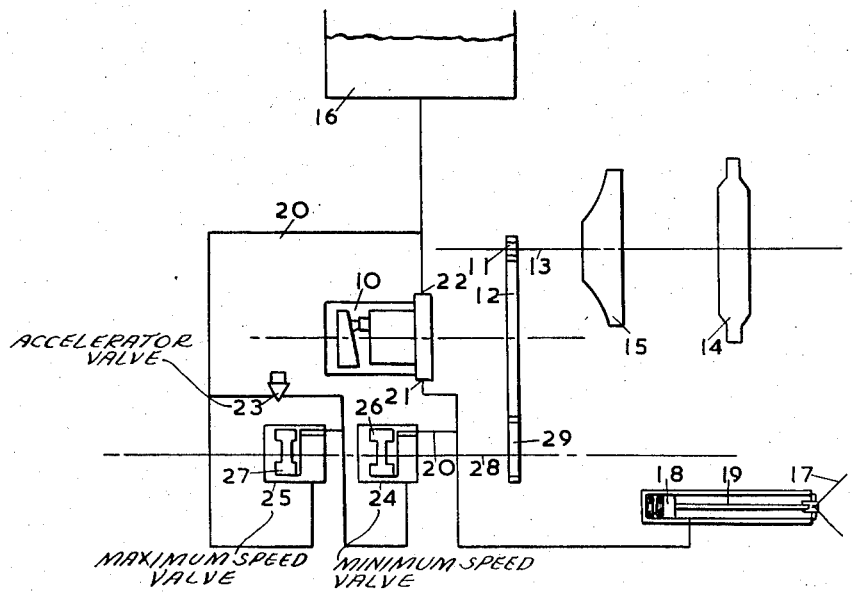
INVENTOR
C. S. KING
by Mawhinney & Mawhinney
ATTYS.

United States Patent Office 2,874,765
Patented Feb. 24, 1959

2,874,765

FUEL SUPPLY SYSTEM FOR A GAS TURBINE ENGINE POWER PLANT

Charles S. King, Solihull, England, assignor to The Rover Company Limited, Solihull, Warwickshire, England Application May 9, 1955, Serial No. 506,992

Claims priority, application Great Britain May 11, 1954

3 Claims. (Cl. 158—36.4)

The invention relates to a fuel supply system for a gas turbine engine power plant of the kind including a turbine-driven compressor for the combustion air, and its object is to enable the speed of the turbine to be varied between predetermined maximum and minimum values.

The fuel supply system of the invention includes a pump, having a constant output characteristic, driven from the engine and delivering liquid fuel to a burner having a fuel jet means of which the effective area is automatically varied in dependence on the rate at which the burner receives the fuel from the pump, there being a by-pass passage, leading from between the pump outlet and the burner inlet, for diverting from the burner a proportion of the pump output responsively to the action of maximum and minimum engine speed control means and an accelerator.

According to a further feature, the flow through the by-pass passage is first through the minimum engine speed control means and then through the accelerator in series, the accelerator being shunted by the maximum engine speed control means whereby to be subservient to the latter.

Preferably, in such a case, the maximum and minimum engine speed control means are valves of which the extent of opening is controlled by governors driven from the engine and the accelerator is a personally-operated valve, the valve of the minimum engine speed control means, in idling conditions, being open to its fullest extent (while the valve of the maximum engine speed control means is closed) and delivering through the accelerator valve which, in those conditions, is fully open; and the valve of the maximum engine speed control means being fully open in maximum speed conditions (while the valve of the minimum engine speed control means is partially closed) whereby to by-pass an appropriate proportion of the fuel held back by the accelerator valve which, in those conditions, can be fully closed.

In the accompanying diagrammatic drawing is shown one arrangement according to the invention in which the fuel pump 10 is of the swash-plate type and is connected to be driven, through reduction gearing 11, 12, from a shaft 13 on which the rotors 14, 15, respectively, of the turbine and compressor are mounted, the pump 10 being supplied with liquid fuel from a reservoir 16.

The burner 17 is of a known type having a piston 18 which is movable, against a bias by the pressure of the fuel supply in a coacting cylinder 19, for appropriately positioning a valve member which controls the effective area of a nozzle for the emission of the fuel into the combustion system, the area of the nozzle increasing as the fuel supply increases, and vice versa.

A by-pass 20 extends from the pump outlet 21 to the pump inlet 22 and the flow through it is controlled by three valves 23, 24, 25. Valves 24 and 25 have their movable elements acted upon by respective governors 26, 27 on a common shaft 28 which is driven, through gearing 12, 29 and at an appropriate ratio, from the rotor shaft 13, and the valve 23 is a personally-operated one.

These valves are arranged in the by-pass 20 so that the fuel entering the by-pass 20 has first to pass through valve 24 which sets the idling (or minimum) speed of the turbine by causing the associated governor 26 to provide a maximum opening of the valve 24 at that speed whereby only sufficient fuel is delivered to the burner 17 for keeping the turbine idling. In these conditions the pressure of the fuel in the cylinder 19 of the burner 17 is low, and the area of the nozzle will be a minimum.

The exhaust from the valve 24 is delivered to two parallel paths of the by-pass, one of these paths containing the valve 25 which sets the maximum speed and the other the accelerator valve 23.

The accelerator valve 23 is to be moved in the closing direction for accelerating the turbine (i. e., for cutting down the amount of fuel which is by-passed, whereby to make it available at the burner 17 whose nozzle will be appropriately opened to deal with the increased supply), and if the extent of closing of the accelerator valve 23 is such as to tend to cause the turbine to over-speed, an appropriate proportion of the exhaust from the idling speed valve 24 is passed through the maximum speed valve 25 which will have been opened by its governor 27.

By choosing a pump of the correct capacity the maximum possible rate of acceleration can be limited to an acceptable value.

What I claim as my invention and desire to secure by Letters Patent of the United States is:

1. A gas turbine engine fuel supply system comprising a source of fuel, an engine-driven fuel pump, a burner to supply heat to the engine, a conduit for supplying fuel to said pump from said fuel source, a conduit for delivering fuel from said pump to said burner, a fuel jet for said burner, means for increasing and decreasing the effective area of said jet in accordance with increase and decrease respectively of the rate at which said burner receives fuel from said pump, a by-pass leading from between the pump outlet and the burner inlet back to said fuel source, an engine-driven-governor-operated minimum speed control valve and an accelerator valve arranged in series in said by-pass, and an engine-driven-governor-operated maximum speed control valve arranged in parallel with said accelerator valve in said by-pass, said valves acting to control the proportion of the fuel which is diverted from said burner to flow through said by-pass.

2. A gas turbine engine fuel supply system comprising a source of fuel, an engine-driven fuel pump, a burner to supply heat to the engine, a conduit for supplying fuel to said pump from said fuel source, a conduit for delivering fuel from said pump to said burner, a fuel jet for said burner, means for increasing and decreasing the effective area of said jet in accordance with increase and decrease respectively of the rate at which said burner receives fuel from said pump, a by-pass leading from between the pump outlet and the burner inlet back to said fuel source, an engine-driven-governor-operated minimum speed control valve and an accelerator valve arranged in series in said by-pass, and an engine-driven-governor-operated maximum speed control valve arranged in parallel with said accelerator valve in said by-pass, said valves acting to control the proportion of the fuel which is diverted from said burner to flow through said by-pass, the minimum speed control valve, in idling conditions, being open to its fullest extent (while the maximum speed control valve is closed) and delivering through the accelerator valve which, in those conditions, is fully open; and the maximum speed control valve being fully open in maximum speed conditions (while the minimum speed control valve is partially closed) whereby to by-pass an appropriate proportion of the fuel held back by the accelerator valve which, in those conditions, can be fully closed.

3. A gas turbine engine fuel supply system comprising a source of fuel, an engine-driven fuel pump, a burner to supply heat to the engine, a conduit for supplying fuel to said pump from said fuel source, a conduit for delivering fuel from said pump to said burner, a fuel jet for said burner, means for increasing and decreasing the effective area of said jet in accordance with increase and decrease respectively of the rate at which said burner receives fuel from said pump, a by-pass leading from between the pump outlet and the burner inlet back to said fuel source, an engine-driven-governor-operated minimum speed control valve and an accelerator valve arranged in series in said by-pass, and an engine-driven-governor-operated maximum speed control valve arranged in parallel with said accelerator valve in said by-pass, said valves acting to control the proportion of the fuel which is diverted from said burner to flow through said by-pass, the minimum speed control valve, in idling conditions, being open to its fullest extent (while the maximum speed control valve is closed) and delivering through the accelerator valve which, in those conditions, is fully open; and the maximum speed control valve being fully open in maximum speed conditions (while the minimum speed control valve is partially closed) whereby to by-pass an appropriate proportion of the fuel held back by the accelerator valve which, in those conditions, can be fully closed, and the flow through the by-pass passage being first through the minimum speed control valve and then through the accelerator valve in series, the accelerator valve being shunted by the maximum engine speed control means whereby to be subservient to the latter.

References Cited in the file of this patent

UNITED STATES PATENTS

| | | |
|---|---|---|
| 2,422,808 | Stokes | June 24, 1947 |
| 2,436,815 | Lum | Mar. 2, 1948 |
| 2,508,260 | Holley | May 16, 1950 |
| 2,592,132 | Feilden et al. | Apr. 8, 1952 |
| 2,609,868 | Carey | Sept. 9, 1952 |
| 2,628,672 | Silvester | Feb. 17, 1953 |
| 2,637,374 | Campbell | May 5, 1953 |